(12) United States Patent
Sada et al.

(10) Patent No.: US 10,047,797 B2
(45) Date of Patent: Aug. 14, 2018

(54) BEARING CONSTITUENT MEMBER, METHOD OF MANUFACTURING BEARING CONSTITUENT MEMBER, AND ROLLING BEARING

(71) Applicants: JTEKT CORPORATION, Osaka-shi, Osaka (JP); NIPPON STEEL & SUMITOMO METAL CORPORATION, Tokyo (JP)

(72) Inventors: Takashi Sada, Kashiwara (JP); Kohei Kanetani, Kashiba (JP); Takahiro Shimano, Yao (JP); Tetsuya Hironaka, Kashiba (JP); Yutaka Neishi, Tokyo (JP); Tomohiro Yamashita, Tokyo (JP)

(73) Assignees: JTEKT CORPORATION, Osaka (JP); NIPPON STEEL & SUMITOMO METAL CORPORATION, Tokyo (JP)

( * ) Notice: Subject to any disclaimer, the term of this patent is extended or adjusted under 35 U.S.C. 154(b) by 35 days.

(21) Appl. No.: 15/366,378

(22) Filed: Dec. 1, 2016

(65) Prior Publication Data

US 2017/0167538 A1 Jun. 15, 2017

(30) Foreign Application Priority Data

Dec. 9, 2015 (JP) .................................. 2015-240441

(51) Int. Cl.
| | |
|---|---|
| C21D 1/06 | (2006.01) |
| F16C 33/62 | (2006.01) |
| C21D 9/40 | (2006.01) |
| C22C 38/02 | (2006.01) |
| C22C 38/04 | (2006.01) |
| C22C 38/22 | (2006.01) |
| C22C 38/24 | (2006.01) |

(Continued)

(52) U.S. Cl.
CPC ................ *F16C 33/62* (2013.01); *C21D 1/06* (2013.01); *C21D 9/40* (2013.01); *C22C 38/02* (2013.01); *C22C 38/04* (2013.01); *C22C 38/22* (2013.01); *C22C 38/24* (2013.01); *C23C 8/32* (2013.01); *C23C 8/80* (2013.01); *F16C 19/364* (2013.01); *F16C 33/64* (2013.01); *Y02P 10/212* (2015.11)

(58) Field of Classification Search
CPC .................................. C21D 9/40; C21D 1/06
See application file for complete search history.

(56) References Cited

U.S. PATENT DOCUMENTS 5,137,375 A 8/1992 Murakami et al.

FOREIGN PATENT DOCUMENTS

| JP | H04-26752 A | 1/1992 |
|---|---|---|
| WO | 2016/017160 A1 | 2/2016 |
| WO | 2016/017162 A1 | 2/2016 |

*Primary Examiner* — Jessee Roe
(74) *Attorney, Agent, or Firm* — Oliff PLC

(57) ABSTRACT

A bearing constituent member includes a base material including steel and a carbonitrided layer that is a surface layer on the steel, the steel including 0.3 to 0.45 mass % of carbon, 0.5 mass % or lower of silicon, 0.4 to 1.5 mass % of manganese, 0.3 to 2 mass % of chromium, 0.1 to 0.35 mass % of molybdenum, 0.2 to 0.4 mass % of vanadium, and a remainder of iron and unavoidable impurities. Surface Vickers hardness at a position at a depth of 50 μm from a surface of a rolling sliding surface is 700 to 800, internal hardness is 550 to 690 in terms of Vickers hardness, and an amount of residual austenite in a range from the surface to a depth of 10 μm is at least 30 vol %.

4 Claims, 20 Drawing Sheets

(51) Int. Cl.
*C23C 8/32* (2006.01)
*F16C 19/36* (2006.01)
*F16C 33/64* (2006.01)
*C23C 8/80* (2006.01)

FIG. 16

| | REPRESENTATIVE COMPONENT (mass%) | | | | | | | | | |
|---|---|---|---|---|---|---|---|---|---|---|
| | CARBON | SILICON | MANGANESE | PHOSPHORUS | SULFUR | COPPER | NICKEL | CHROMIUM | MOLYBDENUM | VANADIUM |
| EXAMPLE 1 | 0.40 | 0.30 | 0.61 | 0.008 | 0.003 | 0.01 | 0.02 | 1.18 | 0.25 | 0.29 |
| EXAMPLE 2 | 0.40 | 0.30 | 0.61 | 0.008 | 0.003 | 0.01 | 0.02 | 1.18 | 0.25 | 0.29 |
| EXAMPLE 3 | 0.40 | 0.30 | 0.61 | 0.008 | 0.003 | 0.01 | 0.02 | 1.18 | 0.25 | 0.29 |
| EXAMPLE 4 | 0.40 | 0.30 | 0.61 | 0.008 | 0.003 | 0.01 | 0.02 | 1.18 | 0.25 | 0.29 |
| EXAMPLE 5 | 0.40 | 0.30 | 0.61 | 0.008 | 0.003 | 0.01 | 0.02 | 1.18 | 0.25 | 0.29 |
| COMPARATIVE EXAMPLE 1 | 0.40 | 0.30 | 0.61 | 0.008 | 0.003 | 0.01 | 0.02 | 1.18 | 0.25 | 0.29 |
| COMPARATIVE EXAMPLE 2 | 0.40 | 0.30 | 0.61 | 0.008 | 0.003 | 0.01 | 0.02 | 1.18 | 0.25 | 0.29 |
| COMPARATIVE EXAMPLE 3 | 0.20 | 0.29 | 0.61 | 0.008 | 0.003 | 0.01 | 0.02 | 1.19 | 0.25 | 0.30 |
| COMPARATIVE EXAMPLE 4 | 0.20 | 0.20 | 0.51 | 0.012 | 0.012 | 0.08 | 1.67 | 0.56 | 0.18 | - |
| COMPARATIVE EXAMPLE 5 | 0.21 | 0.23 | 0.73 | 0.018 | 0.002 | 0.11 | 0.05 | 0.73 | - | - |

FIG. 17

| | | CARBONITRIDING OR CARBURIZING | | | | HOLDING BEFORE QUENCHING | | | TEMPERING | | SECONDARY QUENCHING | | TEMPERING | |
|---|---|---|---|---|---|---|---|---|---|---|---|---|---|---|
| | | CARBON POTENTIAL | AMMONIA CONCENTRATION (vol%) | TEMPERATURE (°C) | HOLDING TIME (min) | CARBON POTENTIAL | TEMPERATURE (°C) | HOLDING TIME (min) | TEMPERATURE (°C) | HOLDING TIME (min) | TEMPERATURE (°C) | HOLDING TIME (min) | TEMPERATURE (°C) | HOLDING TIME (min) |
| EXAMPLE 1 | CARBONITRIDING | 1.3 | 2 | 860 | 360 | - | - | - | 160 | 120 | - | - | - | - |
| EXAMPLE 2 | CARBONITRIDING | 1.25 | 2 | 860 | 360 | - | - | - | 160 | 120 | - | - | - | - |
| EXAMPLE 3 | CARBONITRIDING | 1.2 | 2 | 860 | 360 | - | - | - | 160 | 120 | - | - | - | - |
| EXAMPLE 4 | CARBONITRIDING | 1.15 | 2 | 860 | 360 | - | - | - | 160 | 120 | - | - | - | - |
| EXAMPLE 5 | CARBONITRIDING | 1 | 2 | 860 | 360 | - | - | - | 160 | 120 | - | - | - | - |
| COMPARATIVE EXAMPLE 1 | CARBONITRIDING | 0.9 | 2 | 860 | 360 | - | - | - | 160 | 120 | - | - | - | - |
| COMPARATIVE EXAMPLE 2 | CARBONITRIDING | 0.8 | 2 | 860 | 900 | - | - | - | 160 | 120 | - | - | - | - |
| COMPARATIVE EXAMPLE 3 | CARBONITRIDING | 1.25 | 2 | 900 | 615 | 0.85 | 860 | 15 | 160 | 120 | 830 | 40 | 160 | 120 |
| COMPARATIVE EXAMPLE 4 | CARBURIZING | 1.5 | - | 950 | 285 | 0.9 | 850 | 15 | 160 | 120 | 810 | 40 | 160 | 120 |
| COMPARATIVE EXAMPLE 5 | CARBURIZING | 1.3 | - | 930 | 285 | 1.05 | 850 | 15 | 160 | 120 | - | - | - | - |

FIG. 18

| BEARING MODEL | TRA0607R |
|---|---|
| AXIAL LOAD | 25.89kN |
| INNER RING ROTATING SPEED | 2000min$^{-1}$ |
| LUBRICANT | GEAR OIL 85W90 |
| FOREIGN MATERIAL | HIGH-SPEED STEEL POWDER |
| | VICKERS HARDNESS:730HV |
| | PARTICLE SIZE: 100~150 $\mu$m |
| AMOUNT OF FOREIGN MATERIAL IN LUBRICANT | 0.02 mass% |

FIG. 19

| | SURFACE VICKERS HARDNESS | INTERNAL VICKERS HARDNESS | AMOUNT OF SURFACE RESIDUAL AUSTENITE(%) | $L_{10}$ LIFETIME ($\times 10^6$rev) |
|---|---|---|---|---|
| EXAMPLE 1 | 704.4 | 612.1 | 54 | 2.00 |
| EXAMPLE 2 | 750.0 | 610.6 | 47 | 2.51 |
| EXAMPLE 3 | 771.6 | 622.1 | 40 | 2.75 |
| EXAMPLE 4 | 774.8 | 609.4 | 35 | 2.86 |
| EXAMPLE 5 | 775.2 | 616.3 | 34 | 2.20 |
| COMPARATIVE EXAMPLE 1 | 788.1 | 607.2 | 29 | 1.37 |
| COMPARATIVE EXAMPLE 2 | 795.6 | 618.5 | 21 | 0.86 |
| COMPARATIVE EXAMPLE 3 | 773.9 | 467.5 | 36 | 2.56 |
| COMPARATIVE EXAMPLE 4 | 755.0 | 483.2 | 31 | 1.08 |
| COMPARATIVE EXAMPLE 5 | 732.6 | 375.0 | 27 | 0.78 |

…

BEARING CONSTITUENT MEMBER, METHOD OF MANUFACTURING BEARING CONSTITUENT MEMBER, AND ROLLING BEARING

INCORPORATION BY REFERENCE

The disclosure of Japanese Patent Application No. 2015-240441 filed on Dec. 9, 2015 including the specification, drawings and abstract is incorporated herein by reference in its entirety.

BACKGROUND OF THE INVENTION

1. Field of the Invention

The present invention relates to a bearing constituent member, a method of manufacturing the bearing constituent member, and a rolling bearing including the bearing constituent member.

2. Description of Related Art

In order to lubricate a rolling bearing, a lubricant is used. A foreign material such as wear debris may be in the lubricant. In a case where a rolling bearing is used under conditions in which a foreign material is in a lubricant, the foreign material is pressed against outer and inner rings or a rolling element, and surfaces of the outer and inner rings or a surface of the rolling element may be damaged. A portion in the surface that is damaged by a foreign material causes fatigue spalling due to stress concentration, which leads to a decrease in the lifetime of the rolling bearing. Therefore, a technique of improving the lifetime of a rolling bearing under conditions in which a foreign material is in a lubricant by using, as a raw material of a bearing constituent member, steel in which the nickel content, the chromium content, and the molybdenum content are high has been disclosed (for example, Japanese Patent Application Publication No. 4-26752 (JP 4-26752 A)).

SUMMARY OF THE INVENTION

However, in the steel disclosed in JP 4-26752 A, the nickel content, the chromium content, and the molybdenum content are high, which causes an increase in the manufacturing cost of a bearing constituent member.

In a medium-sized rolling bearing used in a construction machine or the like, in order to secure the hardenability of steel during manufacturing, chromium-molybdenum steel (SCM steel) or nickel-chrome-molybdenum steel (SNCM steel) is used. However, in the medium-sized rolling bearing, relatively large-sized steel is used, and therefore, in order to secure sufficient internal hardness of the rolling bearing, it is necessary to perform a carburizing treatment or a carbonitriding treatment for a very long time period of 930 minutes as shown in FIG. 20. In addition, in SCM steel and SNCM steel, crystal grains are coarsened due to a long time period of the carburizing treatment or the carbonitriding treatment, and toughness deteriorates. Therefore, in a case where SCM steel or SNCM steel is used as steel, it is necessary to perform secondary quenching for reducing the grain size of the coarsened crystal grains, in addition to a carburizing quenching treatment or a carbonitriding quenching treatment, as shown in FIG. 20. Therefore, in a case where SCM steel or SNCM steel is used, the number of processes is increased during the manufacturing and thus the manufacturing cost is increased.

The present invention provides a bearing constituent member which can be inexpensively manufactured and in which a long lifetime can be secured under conditions in which a foreign material is in a lubricant, a method of manufacturing the bearing constituent member, and a rolling bearing.

A first aspect of the present invention relates to a bearing constituent member having a rolling sliding surface that relatively makes contact with a counterpart member, the contact including at least one of rolling contact and sliding contact. The bearing constituent member includes a base material including steel and a carbonitrided layer that is a surface layer on the steel, the steel including 0.3 to 0.45 mass % of carbon, 0.5 mass % or lower of silicon, 0.4 to 1.5 mass % of manganese, 0.3 to 2 mass % of chromium, 0.1 to 0.35 mass % of molybdenum, 0.2 to 0.4 mass % of vanadium, and a remainder of iron and unavoidable impurities. Surface Vickers hardness at a position at a depth of 50 μm from a surface of the rolling sliding surface is 700 to 800, internal hardness is 550 to 690 in terms of Vickers hardness, and an amount of residual austenite in a range from the surface to a depth of 10 μm is at least 30 vol %.

In the bearing constituent member according to the first aspect of the present invention, the surface Vickers hardness at the position at the depth of 50 μm from a surface of the rolling sliding surface is 700 to 800, the internal hardness is 550 to 690 in terms of Vickers hardness, and the amount of residual austenite in the range from the surface to the depth of 10 μm is at least 30 vol %. Thus, in the bearing constituent member according to the above-described aspect of the present invention, a long lifetime can be secured even under conditions in which a foreign material is in a lubricant. Further, the cost of the steel having the above-described composition is low and the steel having the above-described composition has excellent workability. Therefore, the bearing constituent member according to the above-described aspect of the present invention can be inexpensively manufactured.

A second aspect of the present invention relates to a rolling bearing including an outer ring that has a raceway surface on an inner periphery thereof; an inner ring that has a raceway surface on an outer periphery thereof; and a plurality of rolling elements disposed between the raceway surface of the outer ring and the raceway surface of the inner ring. At least one of the outer ring, the inner ring, and the plurality of rolling elements is constituted by the above-described bearing constituent member. Since the rolling bearing according to the above-described aspect of the present invention includes the above-described bearing constituent member, the above-described excellent effects can be obtained. The rolling bearing may be a medium-sized tapered roller bearing. In this case, as compared to a medium-sized tapered roller bearing of the related art which is obtained from steel including large amounts of nickel, chromium, and molybdenum, the rolling bearing according to the above-described aspect of the present invention can be inexpensively manufactured within a short time period. Further, even under conditions in which a foreign material is in a lubricant, it is possible to secure a lifetime that is equal to or longer than that of a medium-sized tapered roller bearing of the related art which is obtained from steel including large amounts of nickel, chromium, and molybdenum.

A third aspect of the present invention relates to a method of manufacturing the above-described bearing constituent member. The method includes a carbonitriding quenching step of performing a carbonitriding quenching treatment of heating and holding a formed material at 830° C. to 930° C. in a carbonitriding atmosphere having a carbon potential of 1 to 1.3 and an ammonia concentration of 1 to 6 vol % and then quenching the base material, the formed material being formed of steel including 0.3 to 0.45 mass % of carbon, 0.5 mass % or lower of silicon, 0.4 to 1.5 mass % of manganese, 0.3 to 2 mass % of chromium, 0.1 to 0.35 mass % of molybdenum, 0.2 to 0.4 mass % of vanadium, and a remainder of iron and unavoidable impurities; and a tempering step of tempering the formed material that has undergone the carbonitriding quenching step, at 150° C. to 250° C.

In the method of manufacturing a bearing constituent member according to the above-aspect of the present invention, the carbonitriding quenching treatment of heating and holding the formed material, which is formed of the steel having the above-described composition, at 830° C. to 930° C. in the carbonitriding atmosphere having the carbon potential of 1 to 1.3 and the ammonia concentration of 1 to 6 vol % and then quenching the formed material is performed, and a tempering treatment of tempering the formed material at 150° C. to 250° C. is performed. Therefore, a bearing constituent member having the above-described excellent effects can be obtained.

According to the bearing constituent member, the method of manufacturing the bearing constituent member, and the rolling bearing including the bearing constituent member according to the aspects of the invention, the bearing constituent member can be inexpensively manufactured, and a long lifetime can be secured even under conditions in which a foreign material is in a lubricant.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 16 is a table showing steel which is used in each of Examples 1 to 5 and Comparative Examples 1 to 5;

FIG. 17 is a table showing the heat treatment conditions of Examples 1 to 5 and Comparative Examples 1 to 5;

FIG. 18 is a table showing conditions of a rolling fatigue test;

FIG. 19 is a table showing the results of Test Example 1; and

DETAILED DESCRIPTION OF EMBODIMENTS

Figure 1:
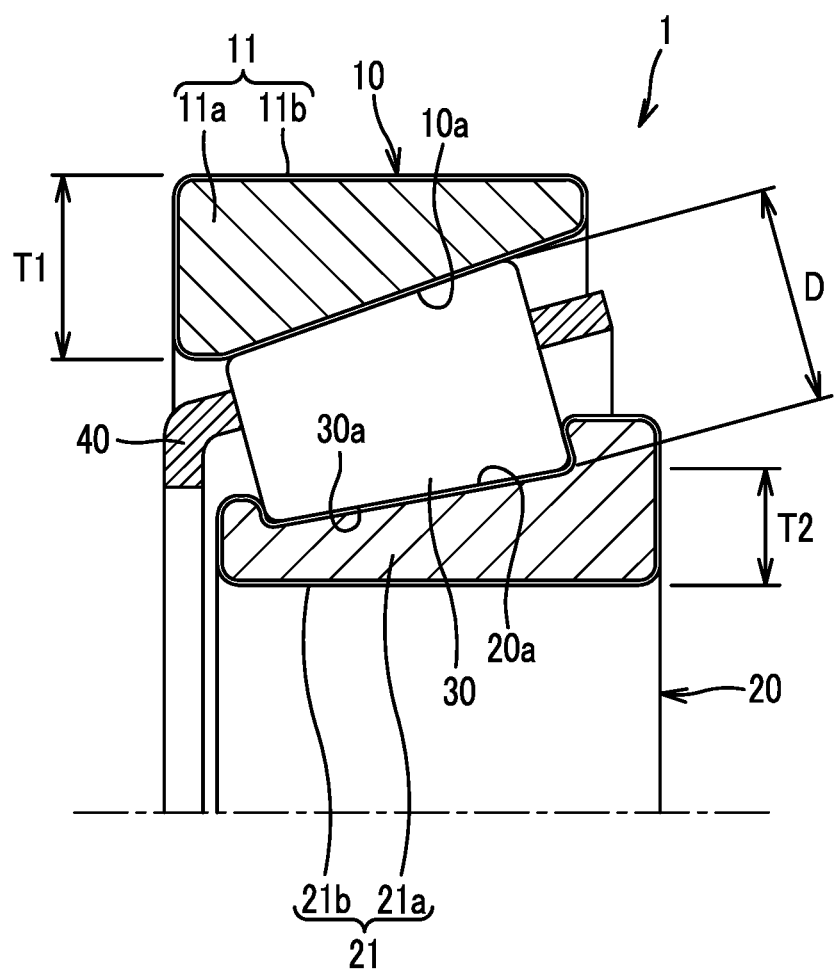
FIG. 1 is a sectional view showing a main part of a tapered roller bearing which is an example of a rolling bearing according to an embodiment of the invention.

Hereinafter, a rolling bearing and a bearing constituent member according to an embodiment of the invention will be described using the accompanying drawings. Hereinafter, a case where each of an outer ring and an inner ring is the bearing constituent member according to the embodiment of the invention will be described as an example. FIG. 1 is a sectional view showing a main part of a tapered roller bearing which is an example of the rolling bearing according to the embodiment of the invention.

A tapered roller bearing 1 shown in FIG. 1 includes: an outer ring 10; an inner ring 20 that is provided on an inner peripheral side relative to the outer ring 10 so as to be concentric with the outer ring 10; a plurality of tapered rollers 30 disposed between the outer ring 10 and the inner ring 20; and a cage 40 that retains the plurality of tapered rollers 30.

The outer and inner rings 10, 20 are members that are formed in a ring shape using steel for a bearing such as bearing steel or carburized steel. In an inner periphery of the outer ring 10, a raceway surface 10a on which the tapered rollers 30 roll is formed to extend along a circumferential direction. In an outer periphery of the inner ring 20, a raceway surface 20a on which the tapered rollers 30 roll is formed to extend along a circumferential direction. The outer ring 10 is disposed concentrically with the inner ring 20 such that the raceway surface 10a faces the raceway surface 20a of the inner ring 20.

The tapered rollers 30 are disposed between the outer and inner rings 10, 20. Each of the tapered rollers 30 can roll on the raceway surfaces 10a, 20a of the outer and inner rings 10, 20. As a result, the outer and inner rings 10, 20 can rotate relative to each other. A surface (rolling surface 30a) of the tapered roller 30 is a rolling sliding surface that relatively makes contact with each of the outer and inner rings 10, 20 that are counterpart members, the contact including at least one of rolling contact and sliding contact.

The cage 40 is a ring-shaped member that is provided concentrically with the outer and inner rings 10, 20. The cage 40 is formed using, for example, metal or synthetic resin. The cage 40 retains the tapered rollers 30 between the outer and inner rings 10, 20.

The tapered roller bearing 1 according to the embodiment is not particularly limited as long as at least one of the outer ring 10, the inner ring, 20, and the tapered rollers 30 is the bearing constituent member according to the embodiment of the invention described below. The rolling bearing according to the embodiment is a medium-sized rolling bearing, and preferably a medium-sized tapered roller bearing, which is used in, for example, an industrial machine or a construction machine. In this specification, "the medium-sized rolling bearing" refers to a bearing in which the outer diameter of the bearing is 90 to 520 mm, the thickness of bearing rings (outer and inner rings) is 9 to 35 mm, and the outer diameter of each rolling element is 10 to 52 mm. In a case where the rolling bearing is a tapered roller bearing, the thickness of the outer ring is represented by T1 in FIG. 1, the thickness of the inner ring is represented by T2 in FIG. 1, and the outer diameter of the rolling element is represented by D in FIG. 1.

In the inner periphery of the outer ring 10 as the bearing constituent member according to the embodiment, the raceway surface 10a on which the tapered rollers 30 roll is formed. The raceway surface 10a is a rolling sliding surface that relatively makes contact with the tapered rollers 30 that are counterpart members, the contact including at least one of rolling contact and sliding contact.

In the outer periphery of the inner ring 20 as the bearing constituent member according to the embodiment, the raceway surface 20a which faces the raceway surface 10a and on which the tapered rollers 30 roll is formed. The raceway surface 20a is a rolling sliding surface that relatively makes contact with the tapered rollers 30 that are counterpart members, the contact including at least one of rolling contact and sliding contact.

In the embodiment, the outer ring 10 is formed of a base material 11 including steel 11a and a carbonitrided layer 11b that is a surface layer on the steel 11a. In addition, the inner ring 20 is formed of a base material 21 including steel 21a, and a carbonitrided layer 21b that is a surface layer on the steel 21a.

Each of the steel 11a and the steel 21a includes 0.3 to 0.45 mass % of carbon, 0.5 mass % or lower of silicon, 0.4 to 1.5 mass % of manganese, 0.3 to 2 mass % of chromium, 0.1 to 0.35 mass % of molybdenum, 0.2 to 0.4 mass % of vanadium, and a remainder of iron and unavoidable impurities. The unavoidable impurities are materials which are incorporated from raw materials during the manufacturing of steel and are allowable within a range where achievement of the object of the invention is not hindered. Examples of the unavoidable impurities include phosphorus, sulfur, copper, and nickel. As the raw material of each of the outer and inner rings 10, 20, the steel having the above-described composition is used and thus is easily processed during manufacturing. Accordingly, each of the outer and inner rings 10, 20 can be inexpensively manufactured.

Carbon is an element which is used to secure the hardenability of the steel during manufacturing of the bearing constituent member, and to improve the hardness of the steel during the carbonitriding quenching treatment as the next step so as to obtain the internal hardness for securing the strength. From the above-described viewpoints, the carbon content in the steel is 0.3 mass % or higher, preferably 0.35 mass % or higher, and more preferably 0.38 mass % or higher, and from the viewpoint of obtaining sufficient workability before the carbonitriding quenching treatment, the carbon content in the steel is 0.45 mass % or lower and preferably 0.42 mass % or lower.

Silicon is an element which is necessary for deoxidation during refining of the steel. The silicon content in the steel is 0.5 mass % or lower and preferably 0.35 mass % or lower from the viewpoints of securing sufficient workability before the carbonitriding quenching treatment and reducing the material cost and the processing cost. Typically, the lower limit of the silicon content in the steel is preferably 0.01 mass % and more preferably 0.02 mass %.

Manganese is an element which is used to improve the hardenability of the steel during the manufacturing of the bearing constituent member so as to improve the hardness of the steel after the carbonitriding quenching treatment. The manganese content in the steel is 0.4 mass % or higher and preferably 0.45 mass % or higher from the viewpoint of improving the hardenability of the steel to improve the hardness of the steel after the carbonitriding quenching treatment. The manganese content in the steel is 1.5 mass % or lower, preferably 1.3 mass % or lower, more preferably 1 mass % or lower, and still more preferably 0.75 mass % or lower from the viewpoint of preventing an excessive increase in the hardness of the base material to prevent a decrease in tool life during cutting in the manufacturing of the bearing constituent member.

Chromium is an element which is used to improve the hardenability of the steel during the manufacturing of the bearing constituent member, and to form a fine precipitate together with vanadium and molybdenum, which are added in combination, during the carbonitriding treatment so as to improve the hardness. The chromium content in the steel is 0.3 mass % or higher and preferably 0.5 mass % or higher from the viewpoints of improving the hardenability of the steel during the manufacturing of the bearing constituent member and forming a fine precipitate during the carbonitriding treatment to improve the hardness. The chromium content in the steel is 2 mass % or lower and preferably 1.8 mass % or lower from the viewpoints of preventing the formation of a coarse precipitate, which causes fatigue fracture, and reducing the material cost and the processing cost.

As in the case of chromium, molybdenum is an element which is used to improve the hardenability of the steel, and to form a fine precipitate together with vanadium and chromium, which are added in combination, during the carbonitriding treatment so as to improve the hardness. Molybdenum has a strong affinity to carbon. Before the carbonitriding quenching treatment, a large amount of molybdenum precipitates in the steel as an undissolved carbide. The undissolved carbide functions as a precipitation nucleus during carbonitriding. Therefore, molybdenum has an effect of increasing the amount of a precipitate after carbonitriding. The molybdenum content in the steel is 0.1 mass % or higher and preferably 0.2 mass % or higher from the viewpoint of improving the hardness. The molybdenum content in the steel is 0.35 mass % or lower and preferably 0.3 mass % or lower from the viewpoints of preventing the formation of a coarse precipitate, which causes fatigue fracture, and reducing the material cost and the processing cost.

As in the case of chromium and molybdenum, vanadium is an element which is used to improve the hardenability of the steel, and to form a fine precipitate together with chromium and molybdenum, which are added in combination, during the carbonitriding treatment so as to improve the hardness. Vanadium has a strong affinity to carbon. The vanadium content in the steel is 0.2 mass % or higher, preferably 0.21 mass % or higher, and more preferably 0.22 mass % or higher from the viewpoint of improving the hardness. The vanadium content in the steel is 0.4 mass % or lower, preferably 0.38 mass % or lower, and more preferably 0.36 mass % or lower from the viewpoints of preventing the formation of a coarse precipitate, which inhibits the solid solution of a sufficient amount of carbon, and reducing the material cost and the processing cost.

Phosphorus is an unavoidable impurity. Therefore, it is preferable that the phosphorus content in the steel should be as low as possible. The phosphorus content in the steel is preferably 0.015 mass % or lower and more preferably 0.013 mass % or lower. Sulfur is an unavoidable impurity. Therefore, it is preferable that the sulfur content in the steel should be as low as possible. The sulfur content in the steel is preferably 0.005 mass % or lower and more preferably 0.004 mass % or lower.

Copper is an unavoidable impurity. Therefore, it is preferable that the copper content in the steel should be as low as possible. The copper content in the steel is preferably 0.2 mass % or lower and more preferably 0.1 mass % or lower.

Nickel is an unavoidable impurity. Since nickel is expensive, it is preferable that the nickel content in the steel should be as low as possible. The nickel content in the steel is preferably 0.2 mass % or lower and more preferably 0.1 mass % or lower.

In each of the carbonitrided layers 11b, 21b, the carbon content is 0.7 to 1.2 mass %, and the nitrogen content is 0.15 to 0.6 mass %. Each of the carbonitrided layers 11b, 21b can be formed by performing the carbonitriding treatment described below on the steel having the above-described composition.

The carbon content in each of the carbonitrided layers 11b, 21b is 0.7 mass % or higher, preferably 0.75 mass % or higher, and more preferably 0.8 mass % or higher from the viewpoint of securing sufficient surface hardness. The carbon content in each of the carbonitrided layers 11b, 21b is 1.2 mass % or lower, preferably 1.1 mass % or lower, more preferably 1.05 mass % or lower, and still more preferably 1.00 mass % or lower from the viewpoint of preventing a coarse carbonitride from remaining.

The nitrogen content in each of the carbonitrided layers 11b, 21b is 0.15 mass % or higher, preferably 0.18 mass % or higher, and more preferably 0.2 mass % or higher from the viewpoint of forming residual austenite and a fine carbonitride. The nitrogen content in each of the carbonitrided layers 11b, 21b is 0.6 mass % or lower, preferably 0.58 mass % or lower, more preferably 0.56 mass % or lower, and still more preferably 0.54 mass % or lower from the viewpoint of preventing the formation of an excess amount of residual austenite.

The surface Vickers hardness at a position at a depth of 50 μm from a surface of each of the raceway surfaces 10a, 20a of the outer and inner rings 10, 20 is 700 or higher and preferably 720 or higher from the viewpoint of securing sufficient hardness for use as a member of the rolling bearing. The surface Vickers hardness is 800 or lower and preferably 780 or lower from the viewpoint of preventing a decrease in lifetime which is caused by a decrease in the amount of residual austenite under conditions in which a foreign material is in a lubricant. Each of the outer and inner rings 10, 20 has surface Vickers hardness in the above-described range. Therefore, sufficient hardness for use as a member of the rolling bearing can be secured. In this specification, the surface Vickers hardness is a value which is measured by cutting the bearing constituent member from a surface of the rolling sliding surface thereof in a depth direction and putting a Vickers indenter on a position at a depth of 50 μm from the surface of the rolling sliding surface.

The internal hardness of each of the outer and inner rings 10, 20 in terms of Vickers hardness is 550 or higher, preferably 570 or higher, and more preferably 600 or higher from the viewpoint of securing a sufficient crushing strength for use as the bearing constituent member. The internal hardness of each of the outer and inner rings 10, 20 in terms of Vickers hardness is 690 or lower, preferably 670 or lower, and more preferably 630 or lower from the viewpoint of securing sufficient toughness for use as the bearing constituent member. Each of the outer and inner rings 10, 20 has internal hardness in the above-described range. Therefore, a sufficient strength for use as a member of the rolling bearing can be secured. In a case where the bearing constituent member is a member constituting the tapered roller bearing 1, "the internal hardness" of the outer ring 10 is hardness measured at a position 12 (refer to FIG. 2) in a section including an axis at a depth which is ½ of the thickness along an imaginary line L, the imaginary line L passing through the center of a generating line of the rolling sliding surface 10a in the width direction and being perpendicular to the generating line. "The internal hardness" of the inner ring 20 is hardness measured at a position 22 (refer to FIG. 2) in the section including the axis at a depth which is ½ of the thickness along an imaginary line M, the imaginary line M passing through the center of a generating line of the rolling sliding surface 20a in the width direction and being perpendicular to the generating line. "The internal hardness" of the tapered roller 30 is hardness measured at an intersection 32 (refer to FIG. 2) in the section including the axis, the intersection 32 being between a first imaginary line N1 and a second imaginary line N2, the first imaginary line N1 passing through the center of a first generating line of the rolling sliding surface 30a on the outer ring 10 side in the width direction and being perpendicular to the first imaginary line, and the second imaginary line N2 passing through the center of a second generating line of the rolling sliding surface 30a on the inner ring 20 side in the axial direction and being perpendicular to the second imaginary line.

The amount of residual austenite in a range from the surface of each of the raceway surfaces 10a, 20a of the outer and inner rings 10, 20 to a depth of 10 μm is at least 30 vol %. The amount of residual austenite in the range from the surface of each of the raceway surfaces 10a, 20a of the outer and inner rings 10, 20 to the depth of 10 μm is preferably 35 vol % or higher, more preferably 37 vol % or higher from the viewpoint of securing a sufficient lifetime under conditions in which a foreign material is in a lubricant. The amount of residual austenite is preferably 50 vol % or lower and more preferably 48 vol % or lower from the viewpoint of securing sufficient hardness for use as a member of the rolling bearing.

Figure 3:
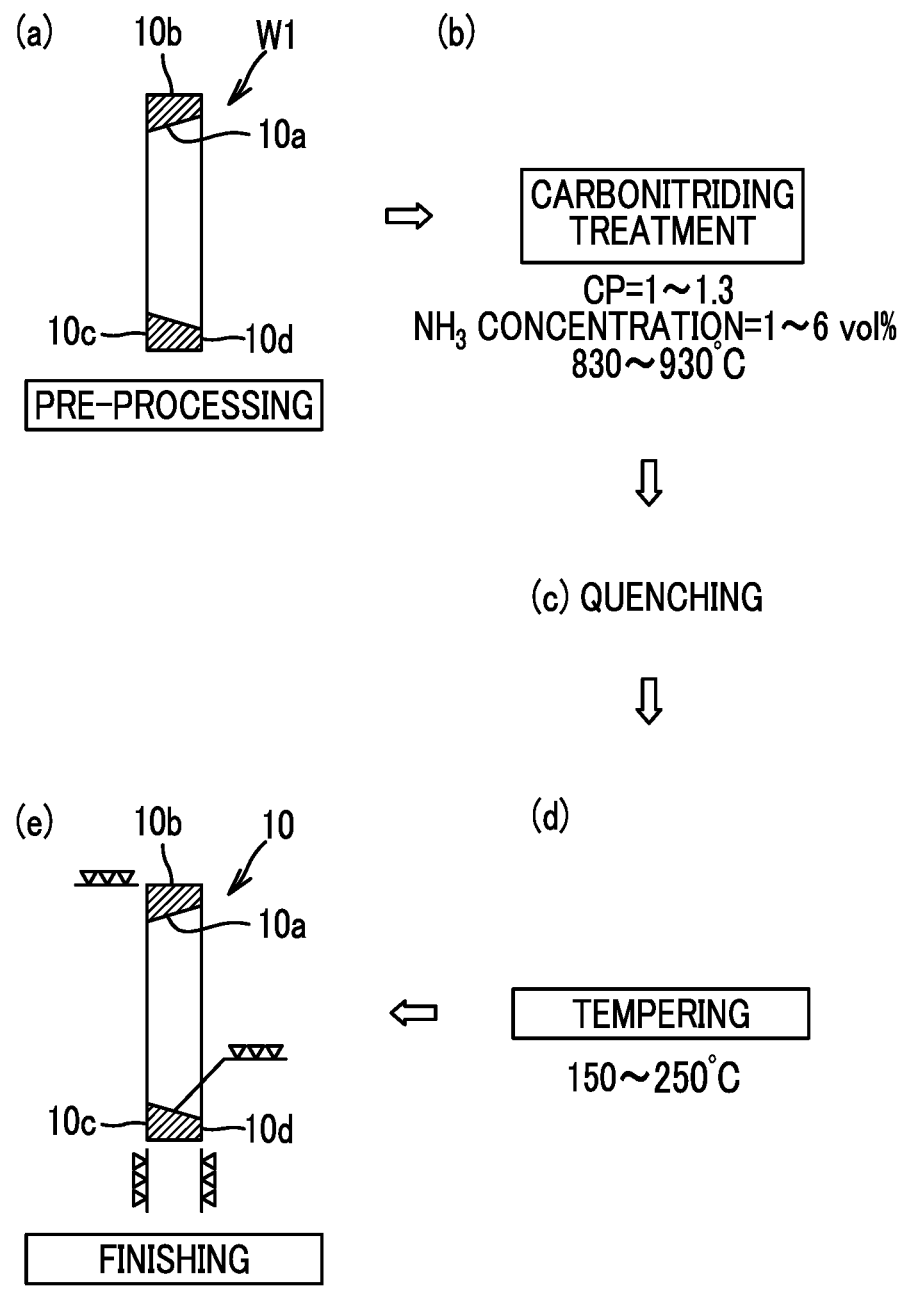
FIG. 3 is a flowchart showing each step of a method of manufacturing an outer ring which is a bearing constituent member according to the embodiment of the invention.

The bearing constituent member according to the embodiment is produced using a method including: a carbonitriding quenching step of performing a carbonitriding quenching treatment of heating and holding a formed material, which is formed of the above-described steel, at 830° C. to 930° C. in a carbonitriding atmosphere having a carbon potential of 1 to 1.3 and an ammonia concentration of 1 to 6 vol % and then quenching the formed material, a tempering step of tempering the formed material, which has undergone the carbonitriding quenching step, at 150° C. to 250° C. Hereinafter, a method of manufacturing an outer ring will be described as an example of the method of manufacturing the bearing constituent member. FIG. 3 is a flowchart showing each step of the method of manufacturing an outer ring which is the bearing constituent member according to the embodiment of the invention.

First, using the above-described steel, a formed material W1 of an outer ring which has a polishing margin in each of portions for forming a raceway surface 10a, an outer peripheral surface 10b and end surfaces 10c, 10d is obtained ("pre-processing step"; refer to (a) of FIG. 3). In the steel used in the manufacturing method according to the embodiment, the content of expensive nickel is 0.2 mass % or lower. Therefore, the bearing constituent member can be manufactured at a low material cost. The steel can be manufactured from molten steel having the above-described composition using a common method.

Next, the obtained formed material W1 is set in a carbonitriding furnace. Next, the carbonitriding treatment is performed on the formed material W1 ("carbonitriding step"; refer to (b) of FIG. 3), and then the formed material W1 having undergone the carbonitriding treatment is rapidly cooled (quenched) ("quenching step"; refer to (c) of FIG. 3). "The carbonitriding step" and "the quenching step" may be also referred to as "carbonitriding quenching step".

The carbonitriding treatment can be performed by heating the formed material W1 at a carbonitriding temperature of 830° C. to 930° C. in an atmosphere (carbonitriding atmosphere) having a carbon potential of 1 to 1.3 and an ammonia concentration of 1 to 6 vol %.

The carbon potential of the carbonitriding atmosphere is 1 or higher from the viewpoint of dispersing a sufficient amount of a carbonitride in a surface portion of the steel such that the hardness at the surface portion is sufficient for use as a member of the rolling bearing. The carbon potential of the carbonitriding atmosphere is 1.3 or lower from the viewpoint of preventing the formation of a coarse carbonitride to improve the lifetime of the bearing constituent member under conditions in which a foreign material is ill a lubricant.

The ammonia concentration of the carbonitriding atmosphere is preferably 1 vol % or higher and more preferably 2 vol % or higher from the viewpoint of dispersing a sufficient amount of a carbonitride in a surface portion of the steel such that the hardness at the surface portion is sufficient for use as a member of the rolling bearing. The ammonia concentration of the carbonitriding atmosphere is preferably 6 vol % or lower, more preferably 5 vol % or lower, and still more preferably 3 vol % or lower from the viewpoint of preventing the formation of a coarse carbonitride to improve the lifetime of the bearing constituent member under conditions in which a foreign material is in a lubricant. Thus, The ammonia concentration of the carbonitriding atmosphere may be set to 2 vol %.

The carbonitriding temperature is 830° C. or higher from the viewpoint of securing a sufficient diffusion rate of carbon and nitrogen to prevent an increase in carbonitriding time and to reduce the manufacturing cost. The carbonitriding temperature is 930° C. or lower from the viewpoint of suppressing the decomposition of ammonia in the carbonitriding atmosphere to secure a sufficient solid solution amount of carbon and nitrogen in the steel and to disperse a sufficient amount of a carbonitride in the surface of the steel.

Typically, the carbonitriding time is preferably 180 minutes or longer and more preferably 240 minutes or longer from the viewpoint of dispersing a sufficient amount of a carbonitride in a surface portion of the steel such that the hardness at the surface portion is sufficient for use as a member of the rolling bearing. As the carbonitriding time increases, the diffusion of carbon and nitrogen in the steel progresses. Therefore, the carbonitriding time may be increased.

The rapid cooling (quenching) is performed, for example, by oil cooling in an oil bath containing cooling oil.

Next, a tempering treatment is performed on the formed material having undergone the carbonitriding quenching treatment (tempering step; refer to (d) FIG. 3). The tempering treatment can be performed by heating the formed material to a tempering temperature of 150° C. to 250° C. and air-cooling the formed material.

The tempering temperature is 150° C. or higher from the viewpoint of securing sufficient toughness for use as a member of the rolling bearing. The tempering temperature is 250° C. or lower from the viewpoint of securing sufficient hardness for use as a member of the rolling bearing.

Typically, the tempering time is preferably 30 minutes or longer and more preferably 40 minutes or longer from the viewpoint of securing sufficient toughness for use as a member of the rolling bearing. Typically, the tempering time is preferably 240 minutes or shorter and more preferably 210 minutes or shorter from the viewpoint of securing sufficient hardness for use as a member of the rolling bearing.

Next, the intermediate material having undergone the tempering step is finished to obtain the outer ring 10 which is the bearing constituent member (finishing; refer to (e) of FIG. 3). The finishing can be performed, for example, by polishing each of the portions for forming the raceway surface 10a, the outer peripheral surface 10b, and the end surfaces 10c, 10d in the intermediate material having undergone the tempering step, and super-finishing the raceway surface 10a such that the intermediate material is finished with a predetermined accuracy. In the outer ring 10, the raceway surface 10a, the outer peripheral surface 10b, and the end surfaces 10c, 10d are polished portions.

Next, the effects of the bearing constituent member and the method of manufacturing the same according to the embodiment of the invention will be verified using examples and the like.

Examples 1 to 5 and Comparative Examples 1 to 5 will be described. Each steel shown in the table of FIG. 16 was processed into a predetermined shape to produce a formed material of each of an outer ring, an inner ring, and a tapered roller for a tapered roller bearing (Model No. TRA0607R).

Next, the produced formed materials were heated and then polished to produce tapered roller bearings according to Examples 1 to 5 and Comparative Examples 1 to 5. Heat treatment conditions in Examples 1 to 5 and Comparative Examples 1 to 5 are shown in the table of FIG. 17 and FIGS. 4 to 13.

Figure 4:
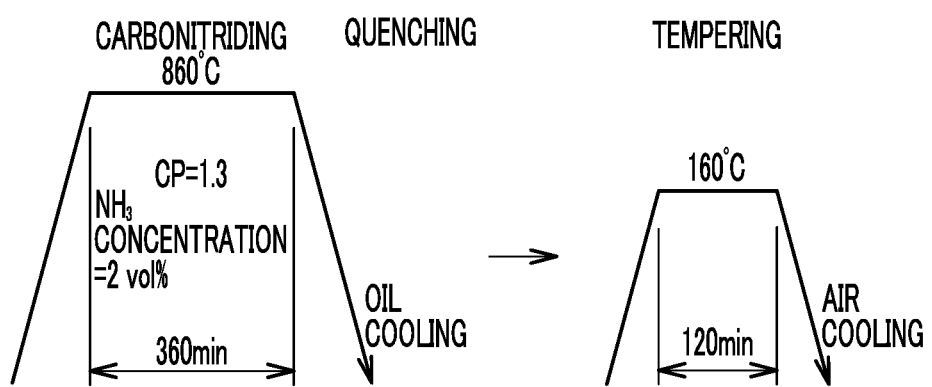
FIG. 4 is a diagram showing heat treatment conditions in Example 1.
Figure 5:
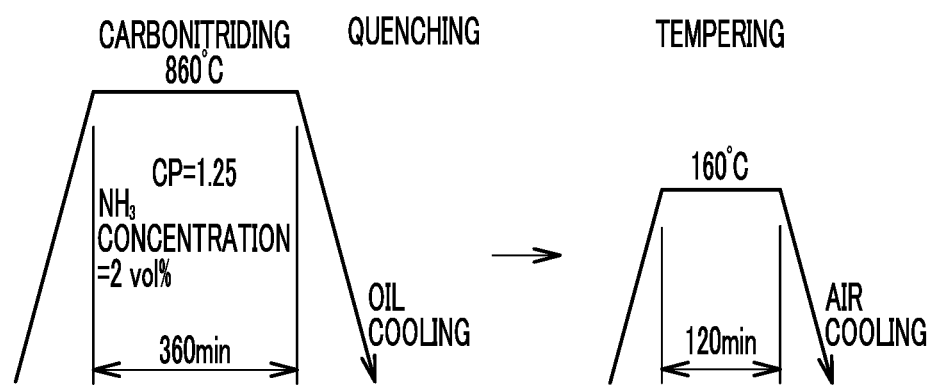
FIG. 5 is a diagram showing heat treatment conditions in Example 2.
Figure 6:
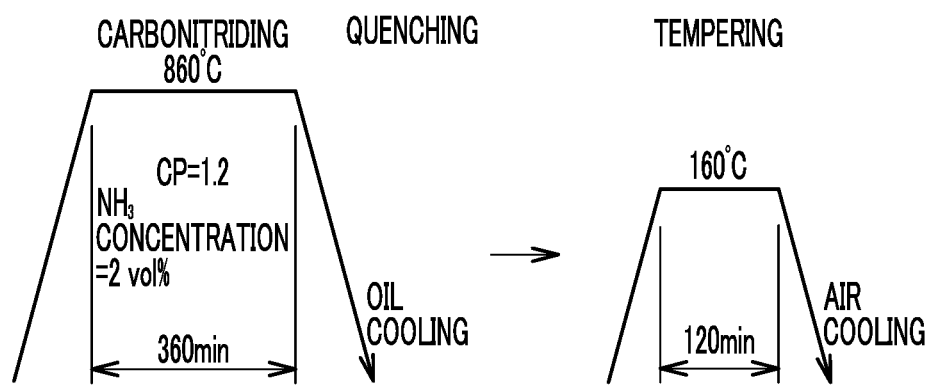
FIG. 6 is a diagram showing heat treatment conditions in Example 3.
Figure 7:
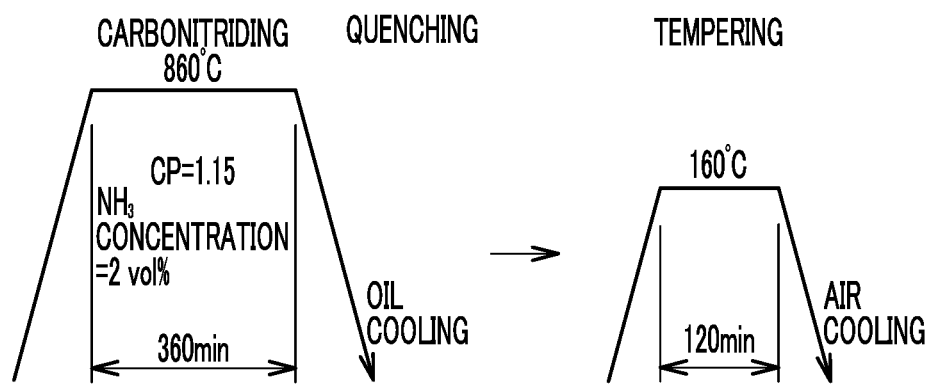
FIG. 7 is a diagram showing heat treatment conditions in Example 4.
Figure 8:
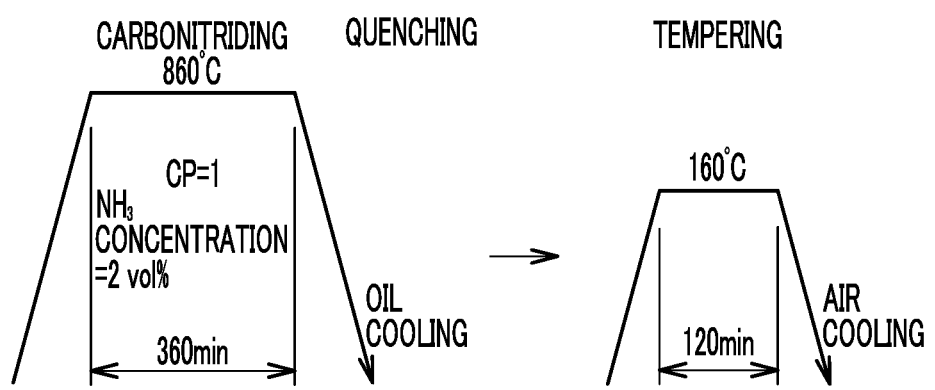
FIG. 8 is a diagram showing heat treatment conditions in Example 5.
Figure 9:
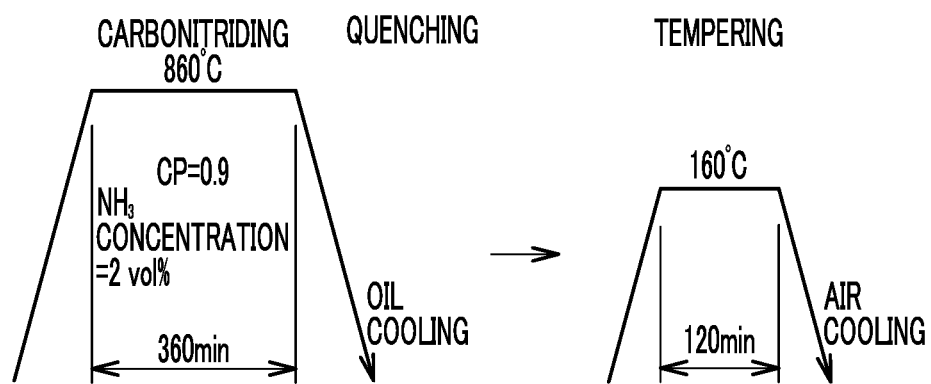
FIG. 9 is a diagram showing heat treatment conditions in Comparative Example 1.
Figure 10:
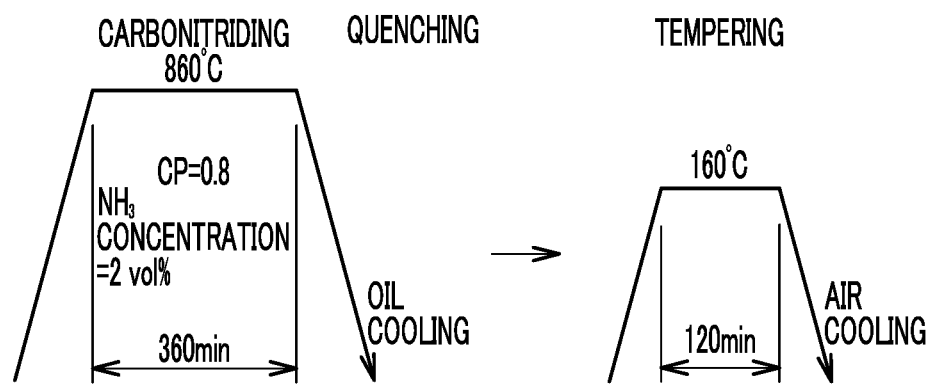
FIG. 10 is a diagram showing heat treatment conditions in Comparative Example 2.
Figure 11:
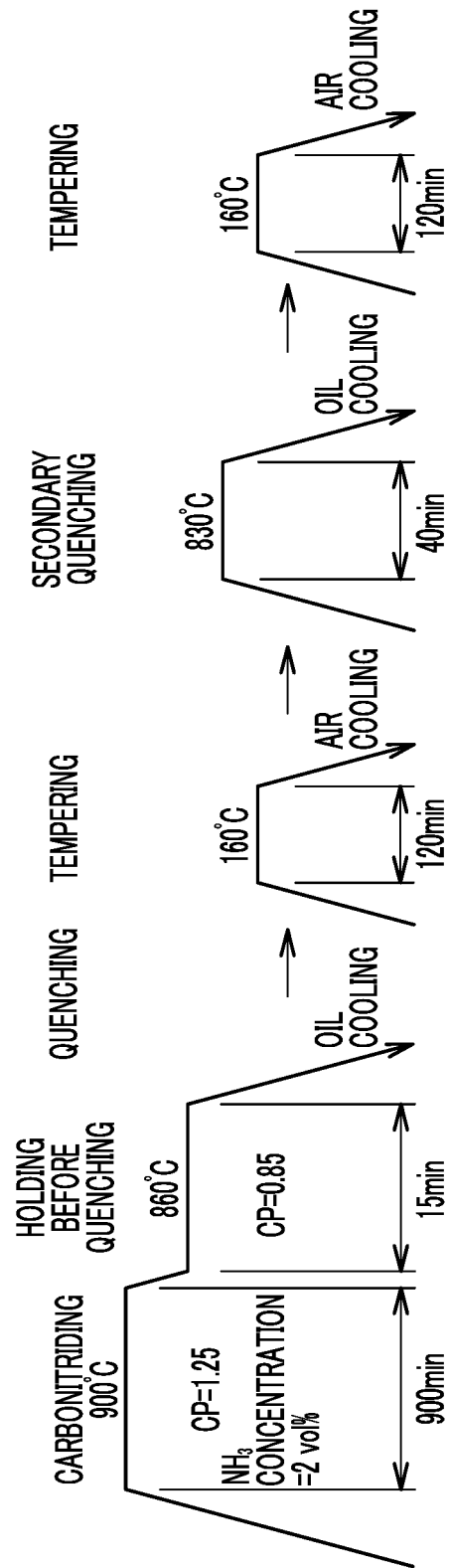
FIG. 11 is a diagram showing heat treatment conditions in Comparative Example 3.
Figure 12:
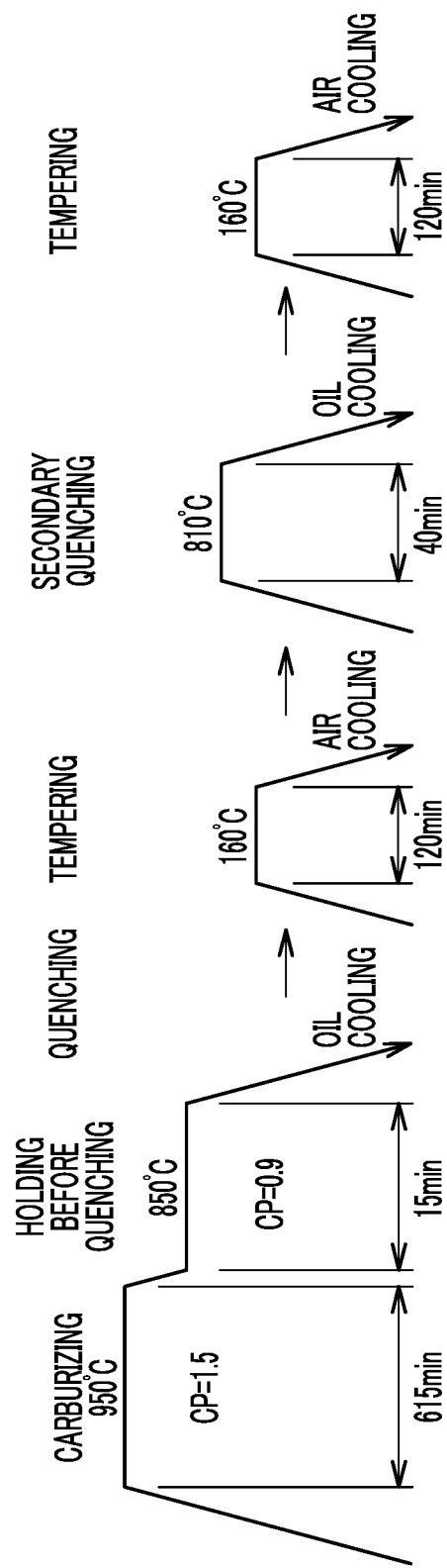
FIG. 12 is a diagram showing heat treatment conditions in Comparative Example 4.
Figure 13:
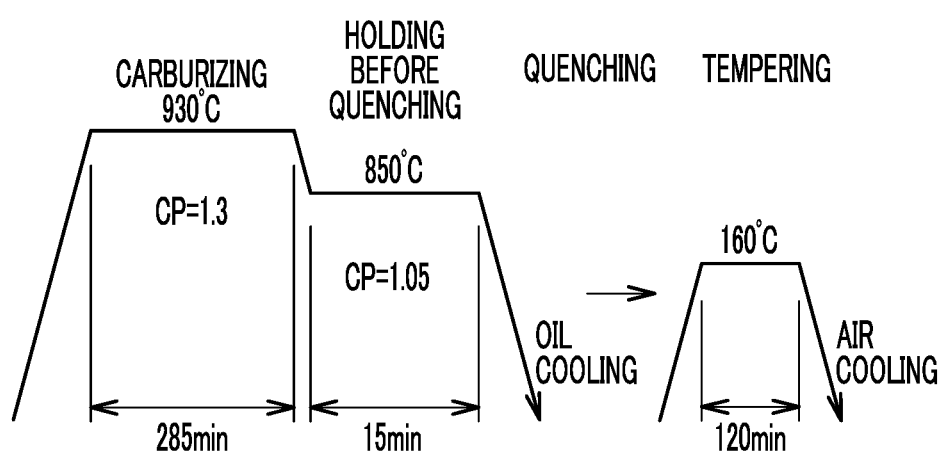
FIG. 13 is a diagram showing heat treatment conditions in Comparative Example 5.

The heat treatment conditions shown in FIG. 4 were as follows (Example 1). The formed material was heated at 860° C. for 360 minutes in a carbonitriding atmosphere having a carbon potential of 1.3 and an ammonia concentration of 2 vol % in a carbonitriding furnace and was oil-cooled to 80° C. (carbonitriding quenching); and the obtained formed material was heated at 160° C. for 120 minutes and was air-cooled (tempering). The heat treatment conditions shown in FIG. 5 were as follows (Example 2). The formed material was heated at 860° C. for 360 minutes in a carbonitriding atmosphere having a carbon potential of 1.25 and an ammonia concentration of 2 vol % in a carbonitriding furnace and was oil-cooled to 80° C. (carbonitriding quenching); and the obtained formed material was heated at 160° C. for 120 minutes and was air-cooled (tempering). The heat treatment conditions shown in FIG. 6 were as follows (Example 3). The formed material was heated at 860° C. for 360 minutes in a carbonitriding atmosphere having a carbon potential of 1.2 and an ammonia concentration of 2 vol % in a carbonitriding furnace and was oil-cooled to 80° C. (carbonitriding quenching); and the obtained formed material was heated at 160° C. for 120 minutes and was air-cooled (tempering). The heat treatment conditions shown in FIG. 7 were as follows (Example 4).

The formed material was heated at 860° C. for 360 minutes in a carbonitriding atmosphere having a carbon potential of 1.15 and an ammonia concentration of 2 vol % in a carbonitriding furnace and was oil-cooled to 80° C. (carbonitriding quenching); and the obtained formed material was heated at 160° C. for 120 minutes and was air-cooled (tempering). The heat treatment conditions shown in FIG. 8 were as follows (Example 5). The formed material was heated at 860° C. for 360 minutes in a carbonitriding atmosphere having a carbon potential of 1 and an ammonia concentration of 2 vol % in a carbonitriding furnace and was oil-cooled to 80° C. (carbonitriding quenching); and the obtained formed material was heated at 160° C. for 120 minutes and was air-cooled (tempering). The heat treatment conditions shown in FIG. 9 were as follows (Comparative Example 1). The formed material was heated at 860° C. for 360 minutes in a carbonitriding atmosphere having a carbon potential of 0.9 and an ammonia concentration of 2 vol % in a carbonitriding furnace and was oil-cooled to 80° C. (carbonitriding quenching); and the obtained formed material was heated at 160° C. for 120 minutes and was air-cooled (tempering). The heat treatment conditions shown in FIG. 10 were as follows (Comparative Example 2). The formed material was heated at 860° C. for 360 minutes in a carbonitriding atmosphere having a carbon potential of 0.8 and an ammonia concentration of 2 vol % in a carbonitriding furnace and was oil-cooled to 80° C. (carbonitriding quenching); and the obtained formed material was heated at 160° C. for 120 minutes and was air-cooled (tempering). The heat treatment conditions shown in FIG. 11 were as follows (Comparative Example 3). The formed material was heated at 900° C. for 900 minutes in a carbonitriding atmosphere having a carbon potential of 1.25 and an ammonia concentration of 2 vol % (carbonitriding) in a carbonitriding furnace; the obtained formed material was heated at 860° C. for 15 minutes (holding before quenching) in a carburizing atmosphere having a carbon potential of 0.85 in the carburizing furnace and was oil-cooled to 80° C.; the obtained formed material was heated at 160° C. for 120 minutes and was air-cooled to 80° C. (tempering); the obtained formed material was heated at 830° C. for 40 minutes and was oil-cooled to 80° C. (secondary quenching); and the obtained formed material was heated at 160° C. for 120 minutes and was air-cooled (tempering). The heat treatment conditions shown in FIG. 12 were as follows (Comparative Example 4). The formed material was heated at 950° C. for 615 minutes (carburizing) in a carburizing atmosphere having a carbon potential of 1.5 in a carburizing furnace; the obtained formed material was heated at 850° C. for 15 minutes (holding before quenching) in a carburizing atmosphere having a carbon potential of 0.9 in the carburizing furnace and was oil-cooled to 80° C.; the obtained formed material was heated at 160° C. for 120 minutes and was air-cooled (tempering); the obtained formed material was heated at 810° C. for 40 minutes and was oil-cooled to 80° C. (secondary quenching); and the obtained formed material was heated at 160° C. for 120 minutes and was air-cooled (tempering). The heat treatment conditions shown in FIG. 13 were as follows (Comparative Example 5). The formed material was heated at 930° C. for 285 minutes (carburizing) in a carburizing atmosphere having a carbon potential of 1.3 in a carburizing furnace; the obtained formed material was heated at 850° C. for 15 minutes (holding before quenching) in a carburizing atmosphere having a carbon potential of 1.05 in the carburizing furnace and was oil-cooled to 80° C.; and the obtained formed material was heated at 160° C. for 120 minutes and was air-cooled (tempering).

Test Example 1 will be described. Regarding an inner ring used in the tapered roller bearing obtained in each of Examples 1 to 5 and Comparative Examples 1 to 5, the surface Vickers hardness at a position at a depth of 50 μm from a surface of the raceway surface, the internal hardness (the internal Vickers hardness), the amount of surface residual austenite in a range from the surface of the raceway surface to a depth of 10 μm, and the lifetime under conditions in which a foreign material is in a lubricant (foreign material-in-oil lifetime) were investigated.

The surface Vickers hardness was measured using a Vickers hardness tester after the inner ring that was obtained in each of Examples 1 to 5 and Comparative Examples 1 to 5 was cut from the surface thereof in a depth direction and a Vickers indenter was placed on a position at a depth of 50 μm from the surface of the raceway surface.

Figure 2:
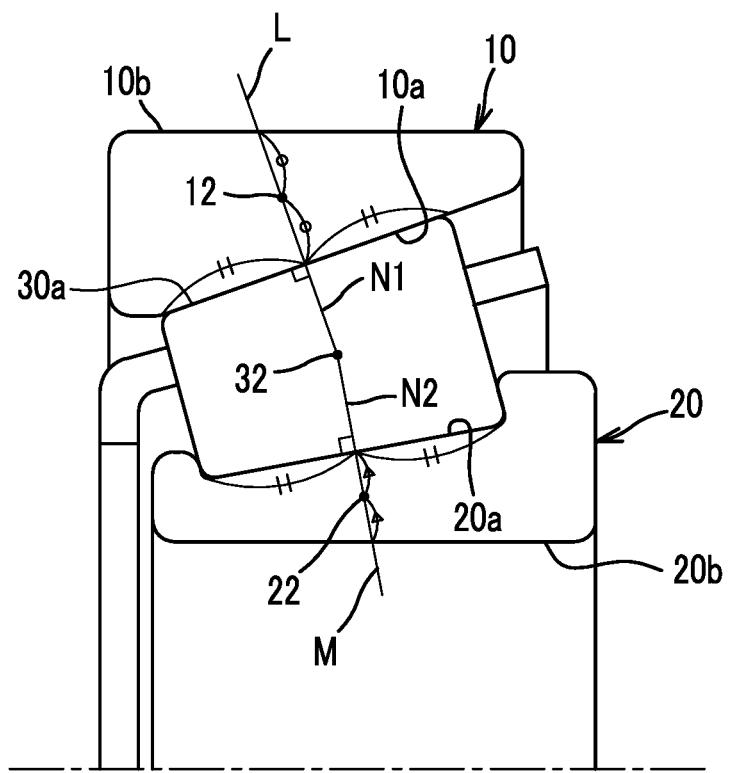
FIG. 2 is a schematic diagram showing the tapered roller bearing shown in FIG. 1.

The internal hardness (the internal Vickers hardness) was measured using the Vickers hardness tester after the inner ring that was obtained in each of Examples 1 to 5 and Comparative Examples 1 to 5 was cut from the surface thereof in a depth direction, and the Vickers indenter was placed on the position 22 in FIG. 2.

The amount of surface residual austenite was investigated by calculating a ratio between integrated intensities of an α-phase (martensite) and a γ-phase (austenite) using X-ray diffraction in a range from the surface of the raceway surface to a depth of 10 μm.

The foreign material-in-oil lifetime was evaluated by performing a rolling fatigue test under conditions shown in the table of FIG. 18 and investigating the $L_{10}$ lifetime indicating a 10% failure probability which was obtained based on the results of the rolling fatigue test. The 10% failure probability was obtained by plotting the results of the rolling fatigue test on Weibull probability paper.

Figure 14:
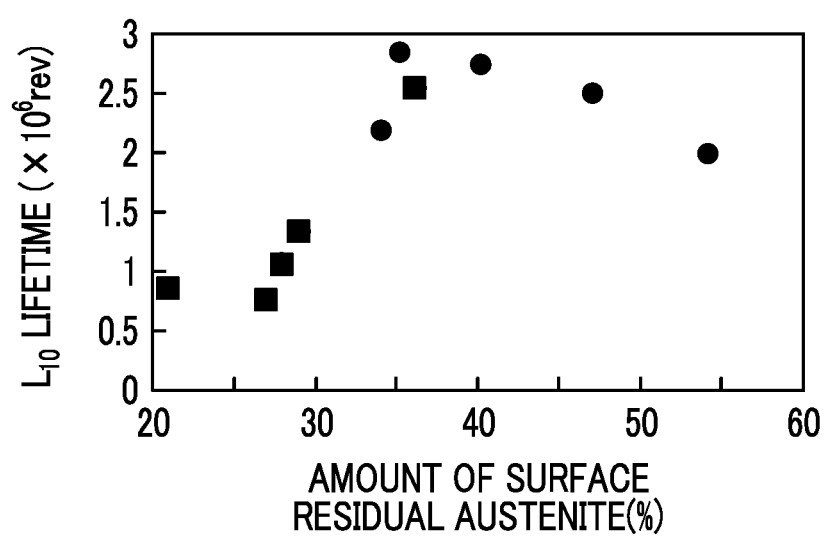
FIG. 14 is a graph showing the results of investigating a relationship between the amount of surface residual austenite and a foreign material-in-oil lifetime ($L_{10}$ lifetime) regarding Test Example 1.
Figure 15:
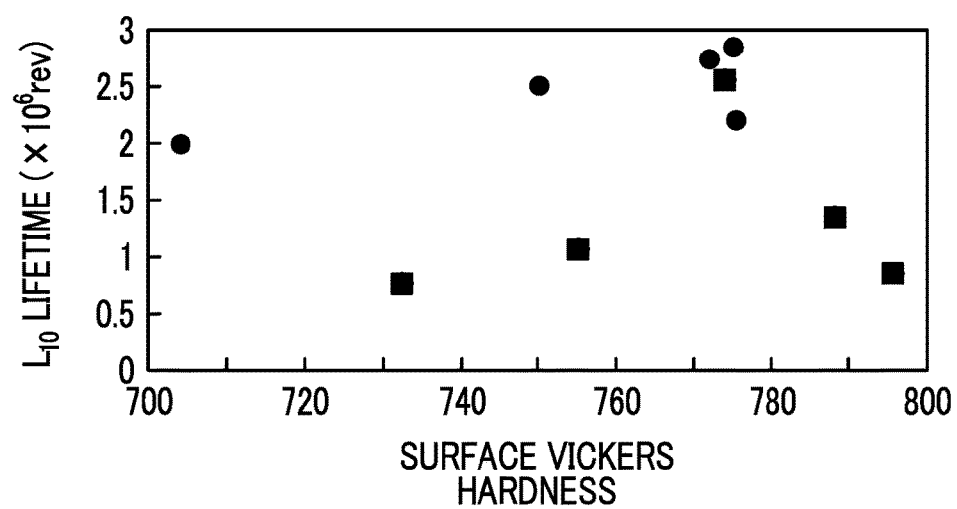
FIG. 15 is a graph showing the results of investigating a relationship between surface Vickers hardness and the foreign material-in-oil lifetime ($L_{10}$ lifetime) regarding Test Example 1.
Figure 20:
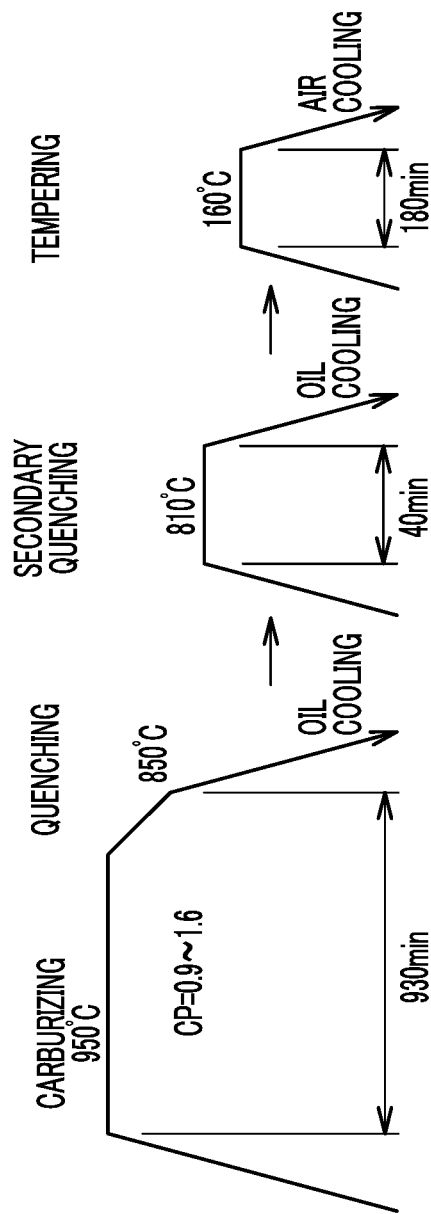
FIG. 20 is a diagram showing heat treatment conditions in a case where SNCM steel is used as a raw material during the manufacturing of a bearing constituent member of the related art.

Regarding Test Example 1, the table of FIG. 19 shows the results of investigating, in the inner ring obtained in each of Examples 1 to 5 and Comparative Examples 1 to 5, the surface Vickers hardness at a position at a depth of 50 μm from a surface of the raceway surface, the internal hardness (the internal Vickers hardness), the amount of surface residual austenite in a range from the surface of the raceway surface to a depth of 10 μm, and the foreign material-in-oil lifetime ($L_{10}$ lifetime). In addition, regarding Test Example 1, FIG. 14 shows the results of investigating a relationship between the amount of surface residual austenite and the foreign material-in-oil lifetime ($L_{10}$ lifetime), and FIG. 15 shows the results of investigating a relationship between the surface Vickers hardness and the foreign material-in-oil lifetime ($L_{10}$ lifetime). In FIGS. 14 and 15, black circles show the results obtained in the respective Examples, and black squares represent the results obtained in the respective Comparative Examples.

It is evident from the table of FIG. 19 and the results of FIGS. 14 and 15 that, in the inner rings obtained in Examples 1 to 5, the surface Vickers hardness was 700 to 800, and the amount of surface residual austenite was 30% or more (34 to 54%). It is evident that the foreign material-in-oil lifetimes ($L_{10}$ lifetimes) of the tapered roller bearings obtained in Examples 1 to 5 were 2.00×10⁶ rev or longer. In contrast, it is evident that, in the inner rings obtained in Comparative Example 1, 2, 4 and 5, the surface Vickers hardness was 700 to 800, and the amount of surface residual austenite was 20% to 31%. It is evident that the foreign material-in-oil lifetimes ($L_{10}$ lifetimes) of the tapered roller bearings obtained in Comparative Examples 1, 2, 4, and 5 were shorter than 1.5×10⁶ rev. With regard to the tapered roller bearing obtained in Comparative Example 3, the foreign material-in-oil lifetime ($L_{10}$ lifetime) was sufficient. However, during the manufacturing, a long carburizing time longer than 9 hours was required, and secondary quenching is required to reduce the size of coarsened crystal grains. Therefore, the manufacturing cost of the tapered roller bearing obtained in Comparative Example 3 was higher than those of the tapered roller bearings obtained in Examples 1 to 5.

It is evident from the results shown in the table of FIG. 19 that the internal hardness (the internal Vickers hardness) of each of the outer rings obtained in Examples 1 to 5 was 600 or higher. Therefore, it is evident that each of the outer rings obtained in Examples 1 to 5 had a sufficient strength as a bearing constituent member.

Based on the above results, it is evident that, a bearing constituent member can be inexpensively manufactured, and a long lifetime of the bearing constituent member can be secured even under conditions in which a foreign material is in a lubricant, the bearing constituent member including a base material that includes steel and a carbonitrided layer that is a surface layer on the steel, the steel including 0.3 to 0.45 mass % of carbon, 0.5 mass % or lower of silicon, 0.4 to 1.5 mass % of manganese, 0.3 to 2 mass % of chromium, 0.1 to 0.35 mass % of molybdenum, 0.2 to 0.4 mass % of vanadium, and a remainder of iron and unavoidable impurities, wherein surface Vickers hardness at a depth position of 50 μm from a surface of the rolling sliding surface is 700 to 800, internal hardness (internal Vickers hardness) is 550 to 690, and an amount of residual austenite in a range from the surface to a depth of 10 μm is at least 30 vol %.

What is claimed is:

1. A bearing constituent member having a rolling sliding surface that relatively makes contact with a counterpart member, the contact including at least one of rolling contact and sliding contact, the bearing constituent member comprising a base material including steel and a carbonitrided layer that is a surface layer on the steel, the steel including 0.3 to 0.45 mass % of carbon, 0.5 mass % or lower of silicon, 0.4 to 1.5 mass % of manganese, 0.3 to 2 mass % of chromium, 0.1 to 0.35 mass % of molybdenum, 0.2 to 0.4 mass % of vanadium, and a remainder of iron and unavoidable impurities, wherein surface Vickers hardness at a position at a depth of 50 μm from a surface of the rolling sliding surface is 700 to 800, internal hardness is 550 to 690 in terms of Vickers hardness, and an amount of residual austenite in a range from the surface to a depth of 10 μm is at least 30 vol %.

2. A rolling bearing comprising:

an outer ring that has a raceway surface on an inner periphery thereof;

an inner ring that has a raceway surface on an outer periphery thereof; and a plurality of rolling elements disposed between the raceway surface of the outer ring and the raceway surface of the inner ring, wherein at least one of the outer ring, the inner ring, and the plurality of rolling elements is constituted by the bearing constituent member according to claim 1.

3. The rolling bearing according to claim 2, wherein the rolling bearing is a medium-sized tapered roller bearing.

4. A method of manufacturing the bearing constituent member according to claim 1, the method comprising:

a carbonitriding quenching step of performing a carbonitriding quenching treatment of heating and holding a formed material at 830° C. to 930° C. in a carbonitriding atmosphere having a carbon potential of 1 to 1.3 and an ammonia concentration of 1 to 6 vol % and then quenching the base material, the formed material being formed of steel including 0.3 to 0.45 mass % of carbon, 0.5 mass % or lower of silicon, 0.4 to 1.5 mass % of manganese, 0.3 to 2 mass % of chromium, 0.1 to 0.35 mass % of molybdenum, 0.2 to 0.4 mass % of vanadium, and a remainder of iron and unavoidable impurities; and a tempering step of tempering the formed material that has undergone the carbonitriding quenching step, at 150° C. to 250° C.

* * * * *